Sept. 27, 1932.  C. B. HARPER  1,880,019
AIRPLANE
Filed April 3, 1922    19 Sheets-Sheet 1

Inventor
C.B.Harper

Sept. 27, 1932.    C. B. HARPER    1,880,019
AIRPLANE
Filed April 3, 1922    19 Sheets-Sheet 2

Fig. 2.

Inventor
C. B. Harper

By
Attorney

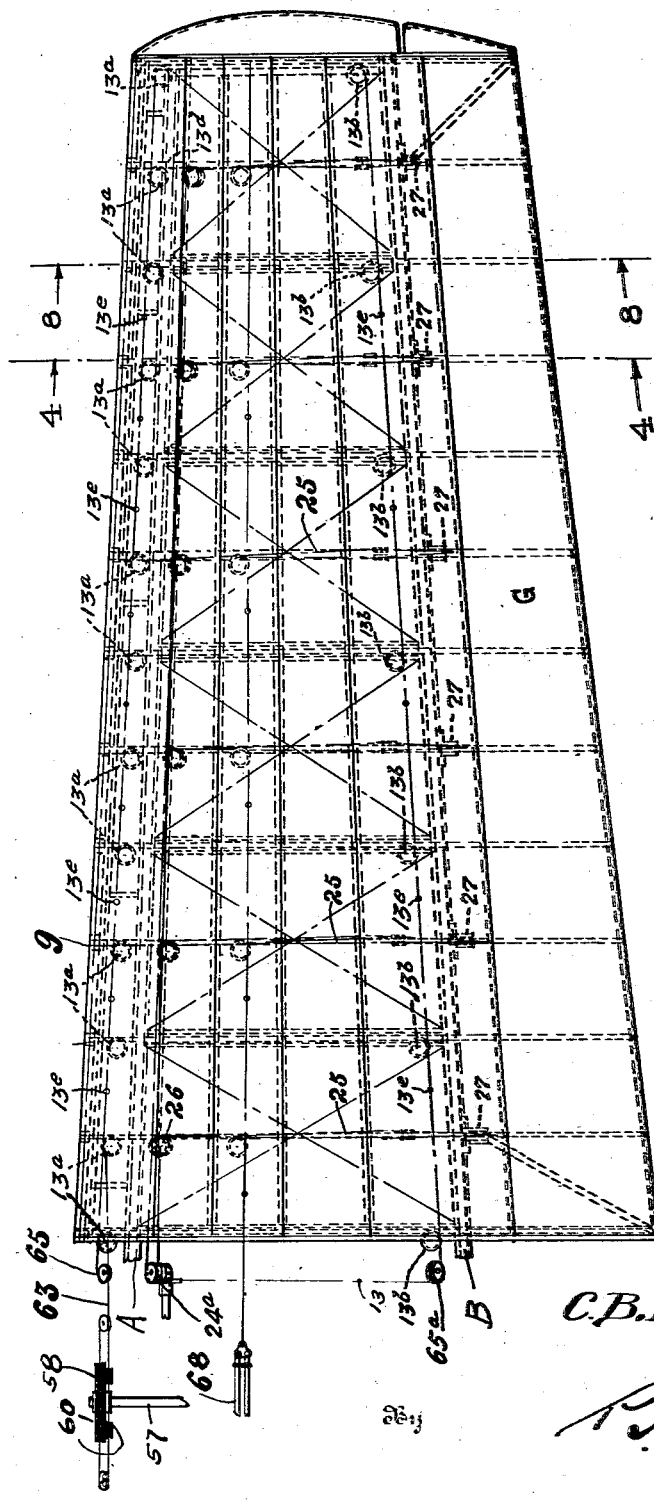

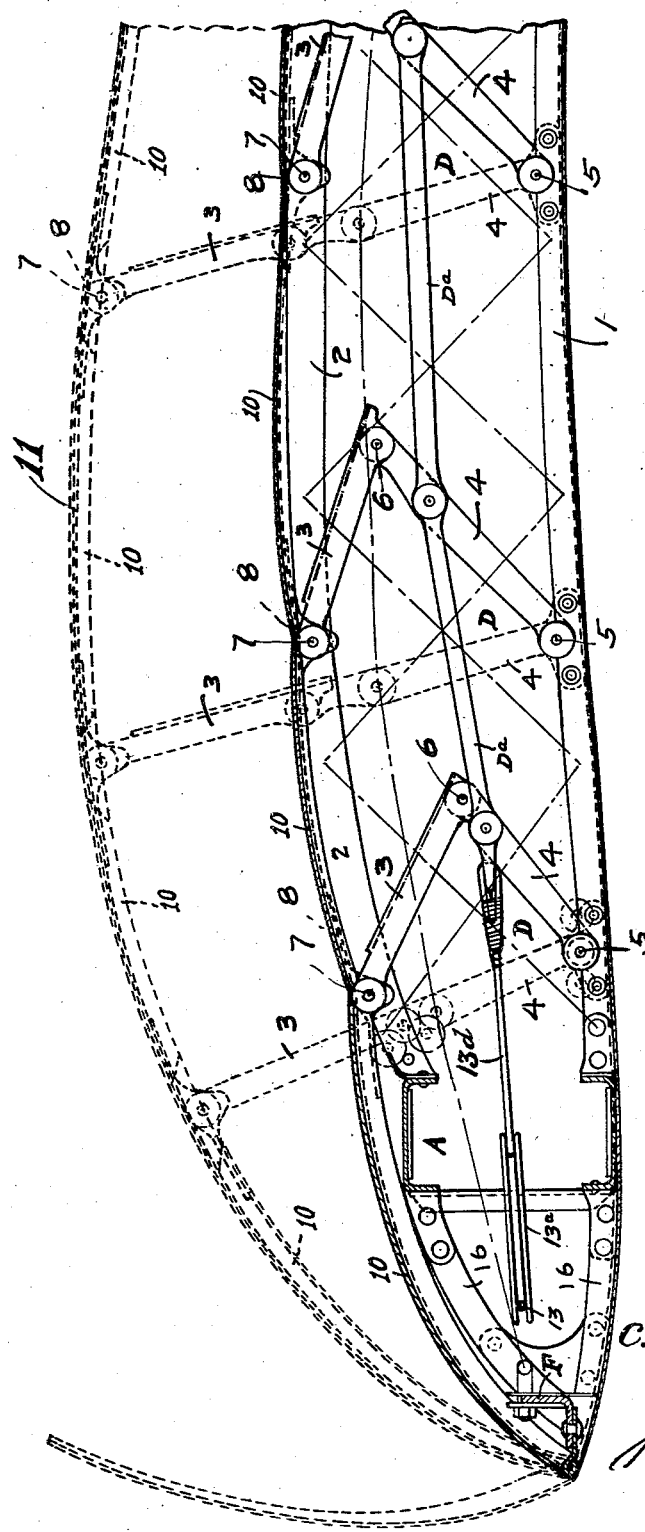

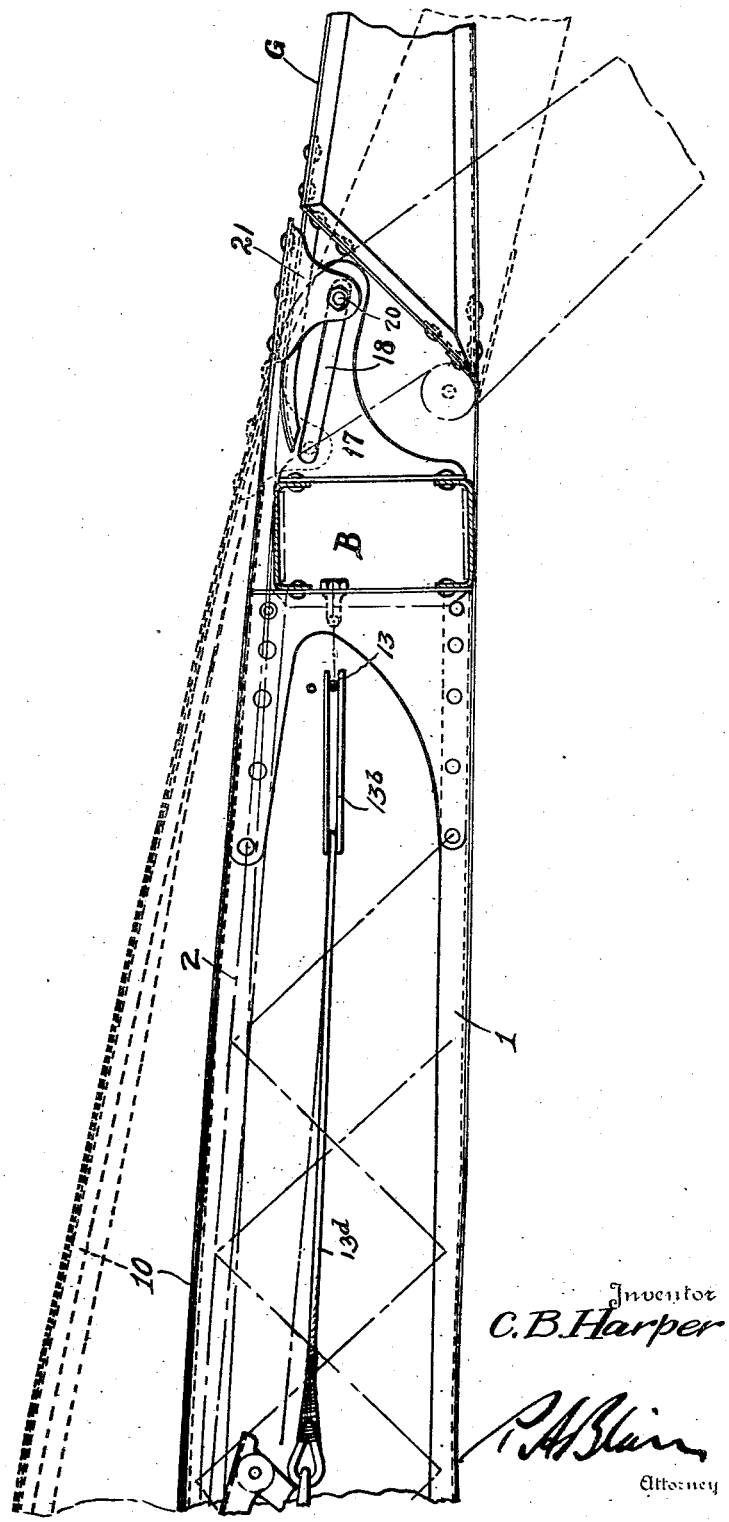

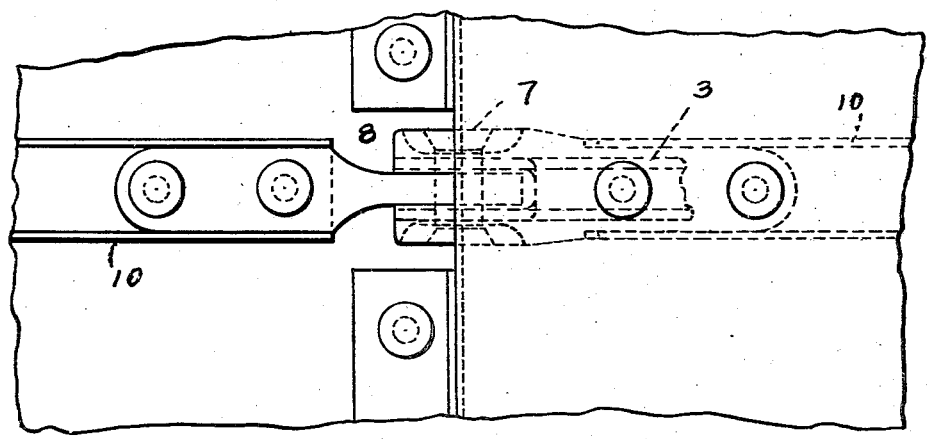
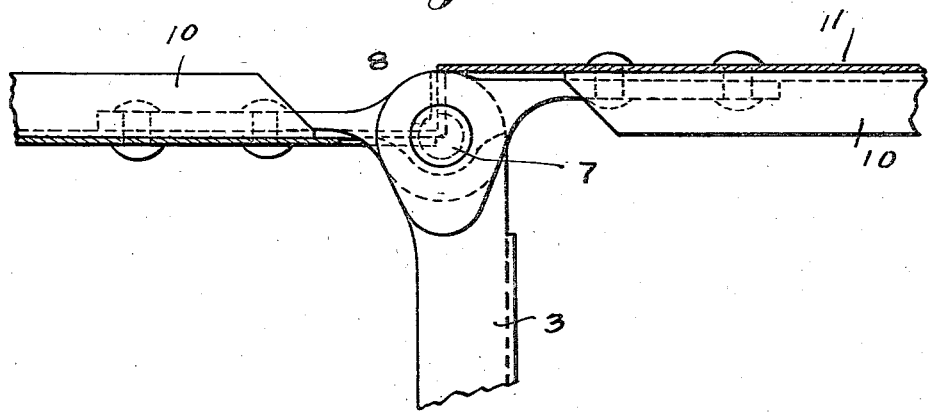

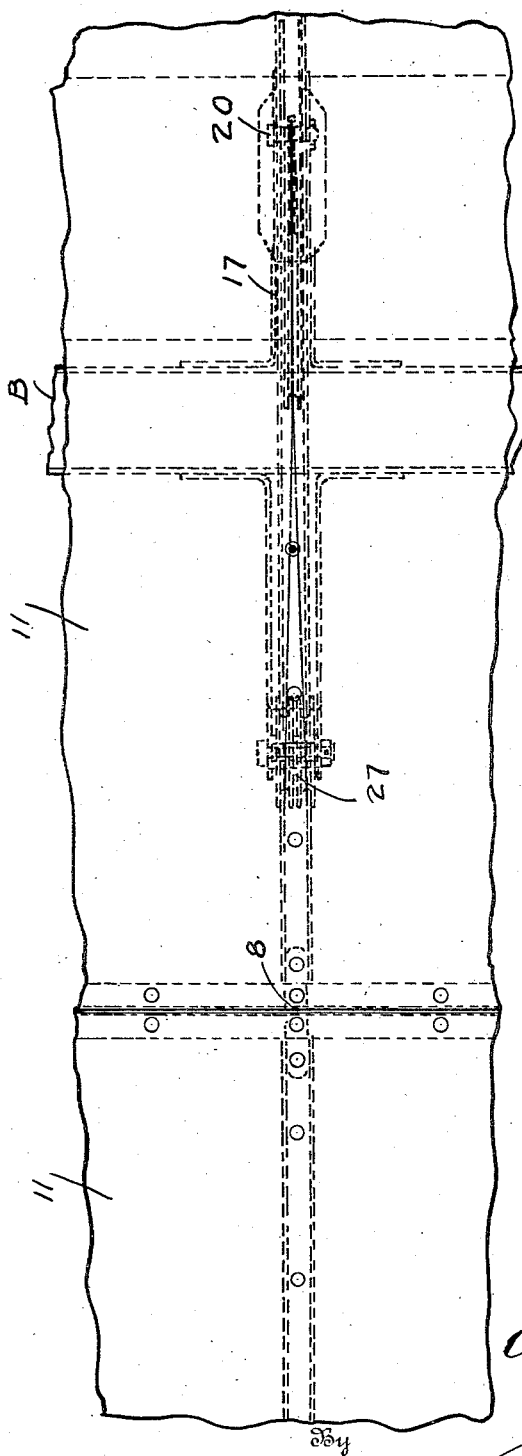

Sept. 27, 1932. C. B. HARPER 1,880,019
AIRPLANE
Filed April 3, 1922 19 Sheets-Sheet 8
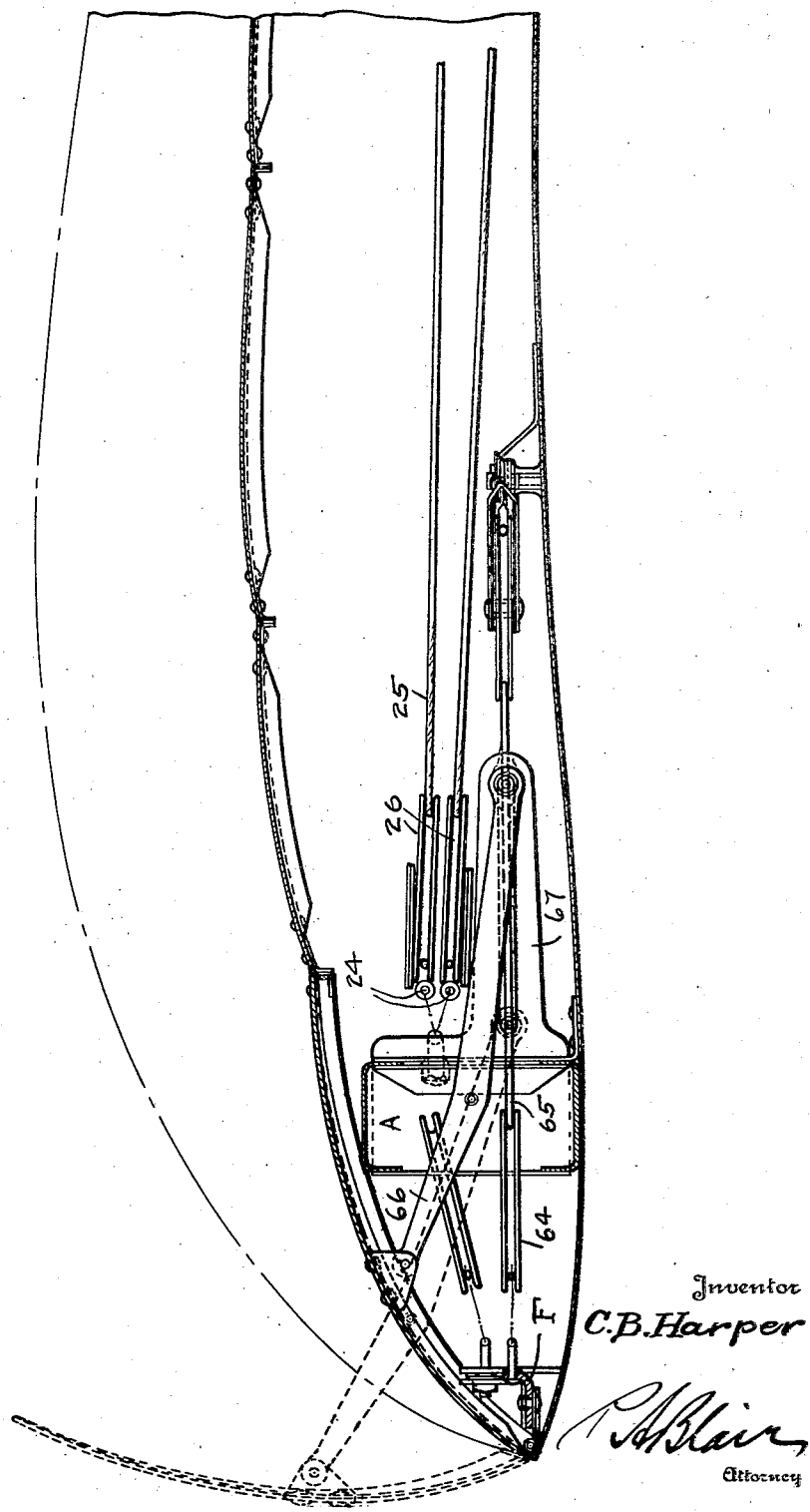

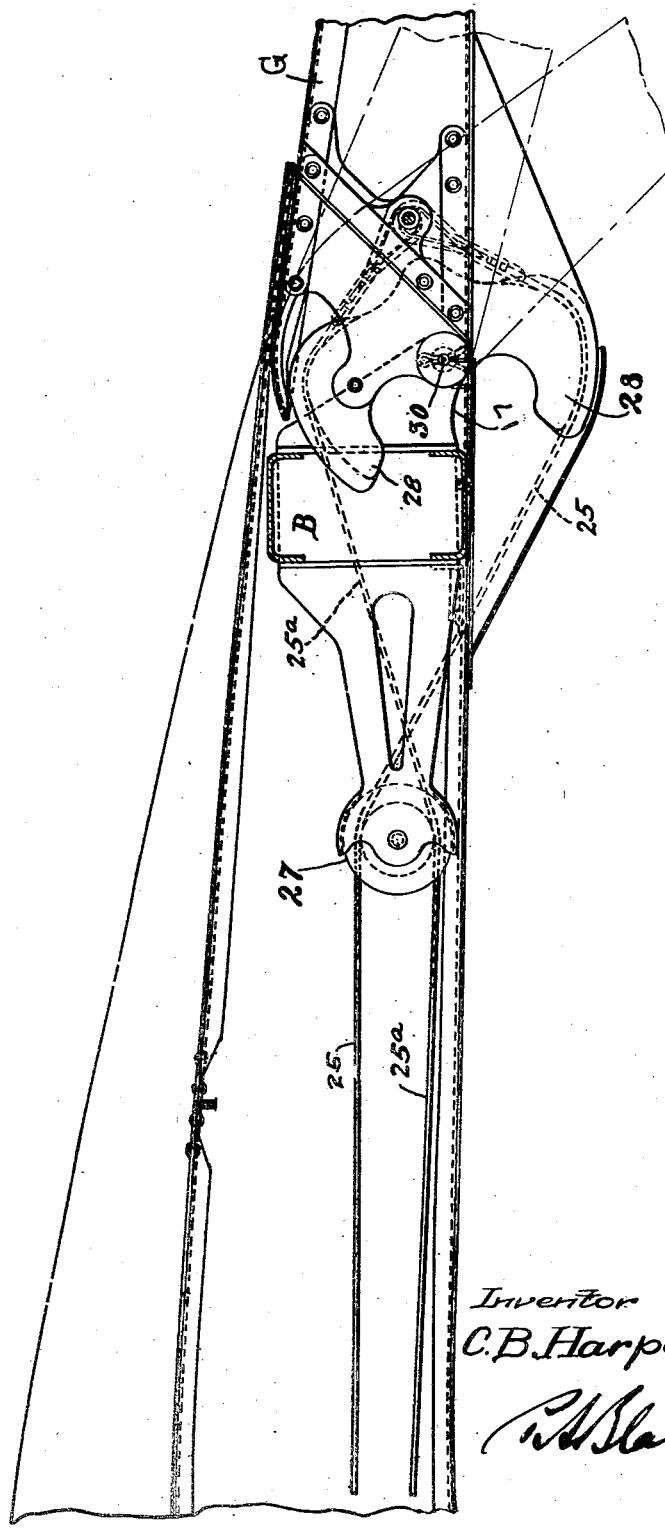

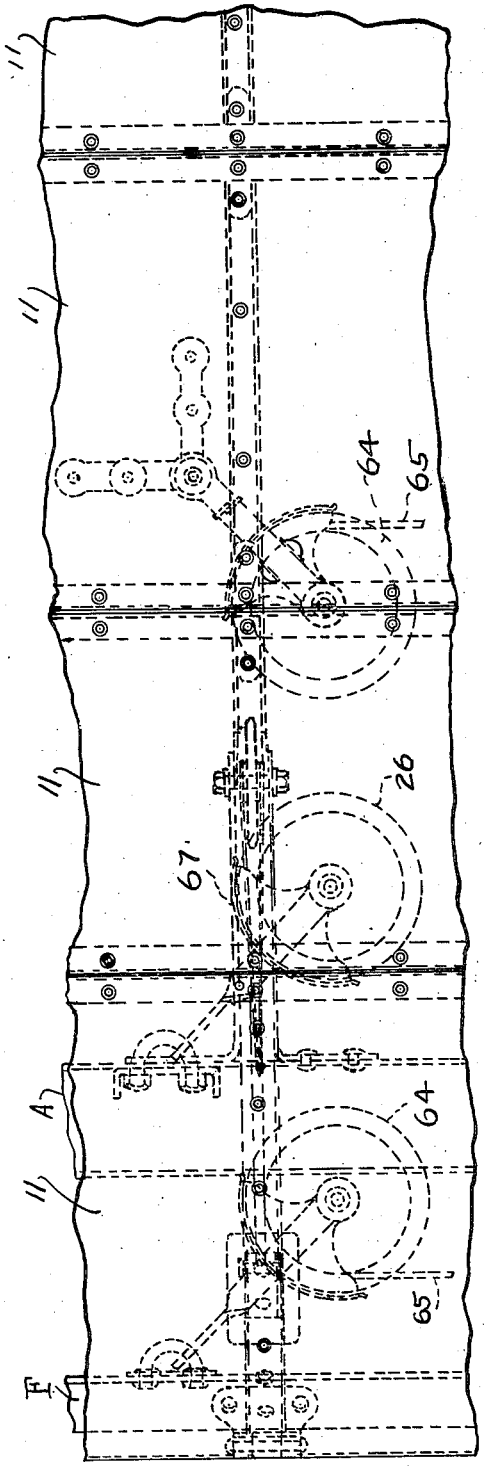

Sept. 27, 1932. C. B. HARPER 1,880,019
AIRPLANE
Filed April 3, 1922 19 Sheets-Sheet 11
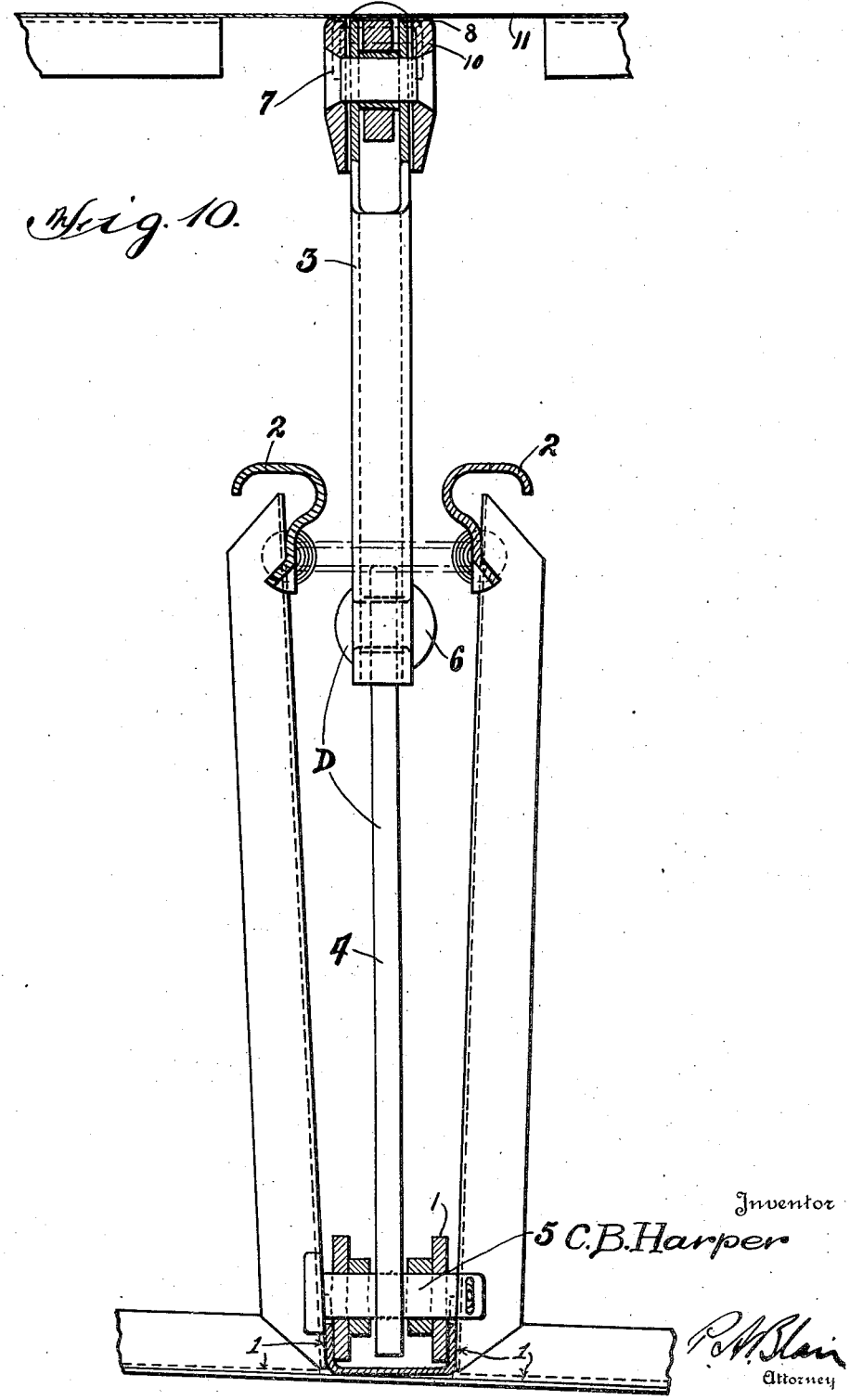

Sept. 27, 1932.　　　C. B. HARPER　　　1,880,019
AIRPLANE
Filed April 3, 1922　　19 Sheets-Sheet 12
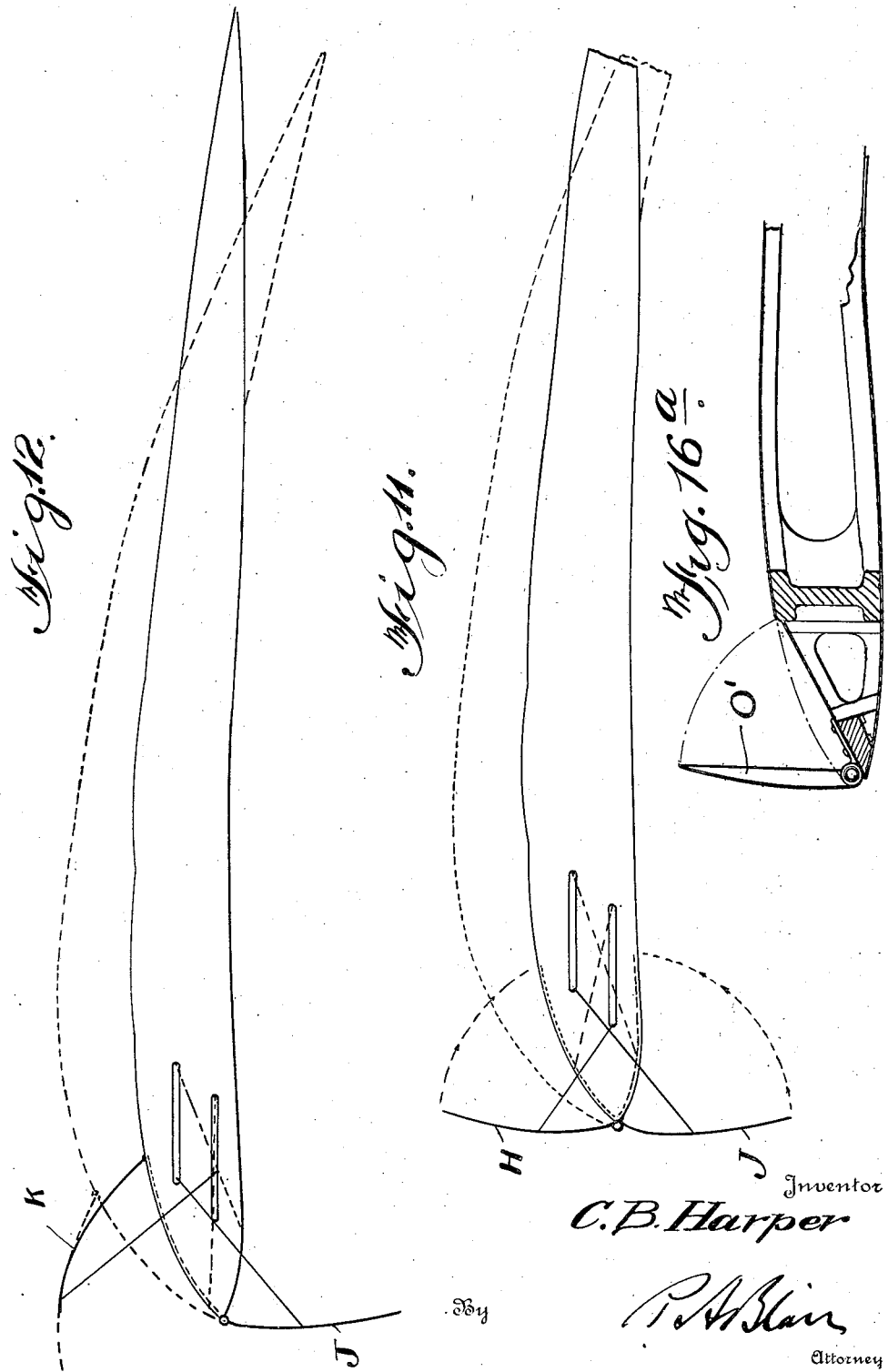
Inventor
C. B. Harper
By
P. H. Blair
Attorney Sept. 27, 1932.  C. B. HARPER  1,880,019
AIRPLANE
Filed April 3, 1922   19 Sheets-Sheet 14
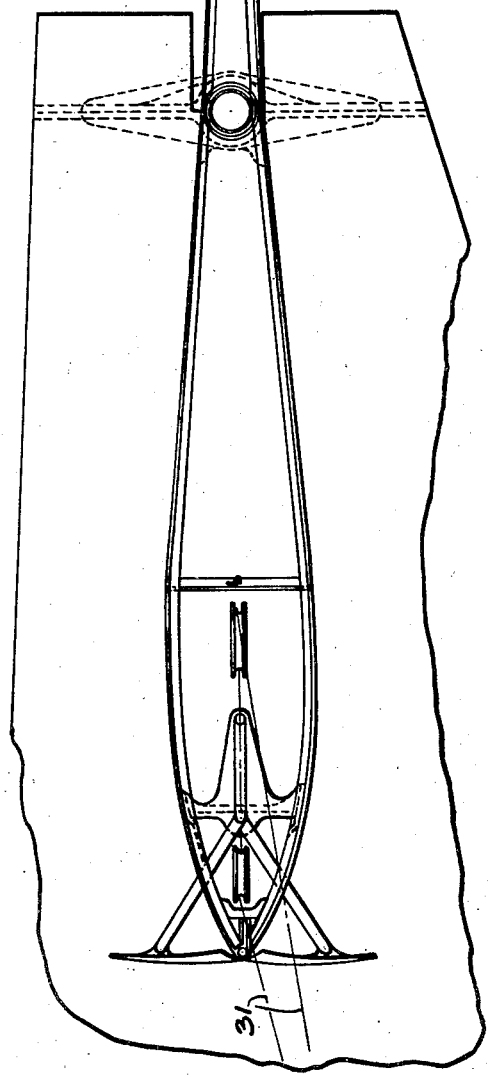
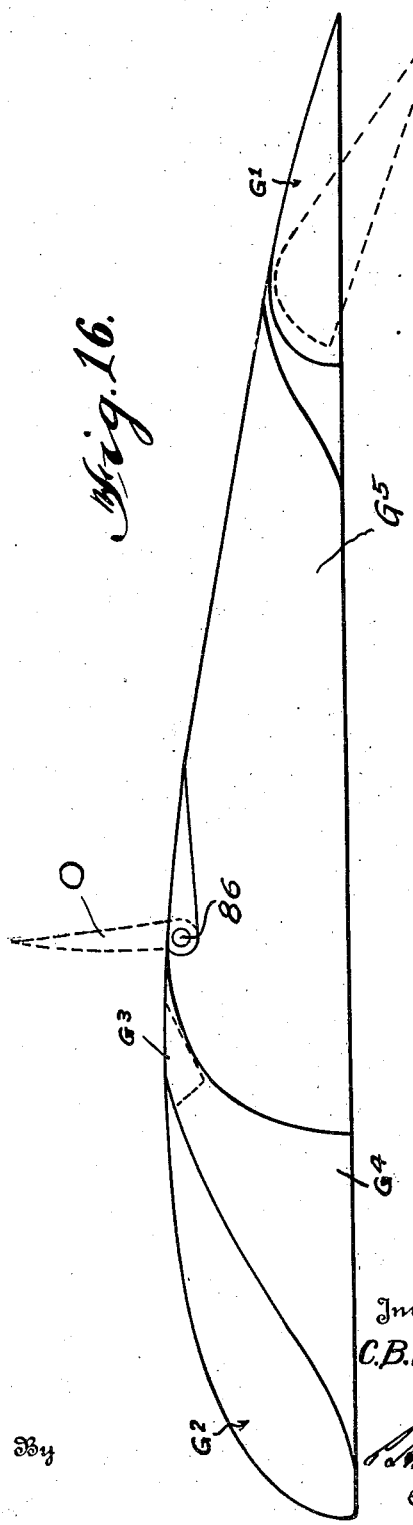
Inventor
C. B. Harper
By
Attorney

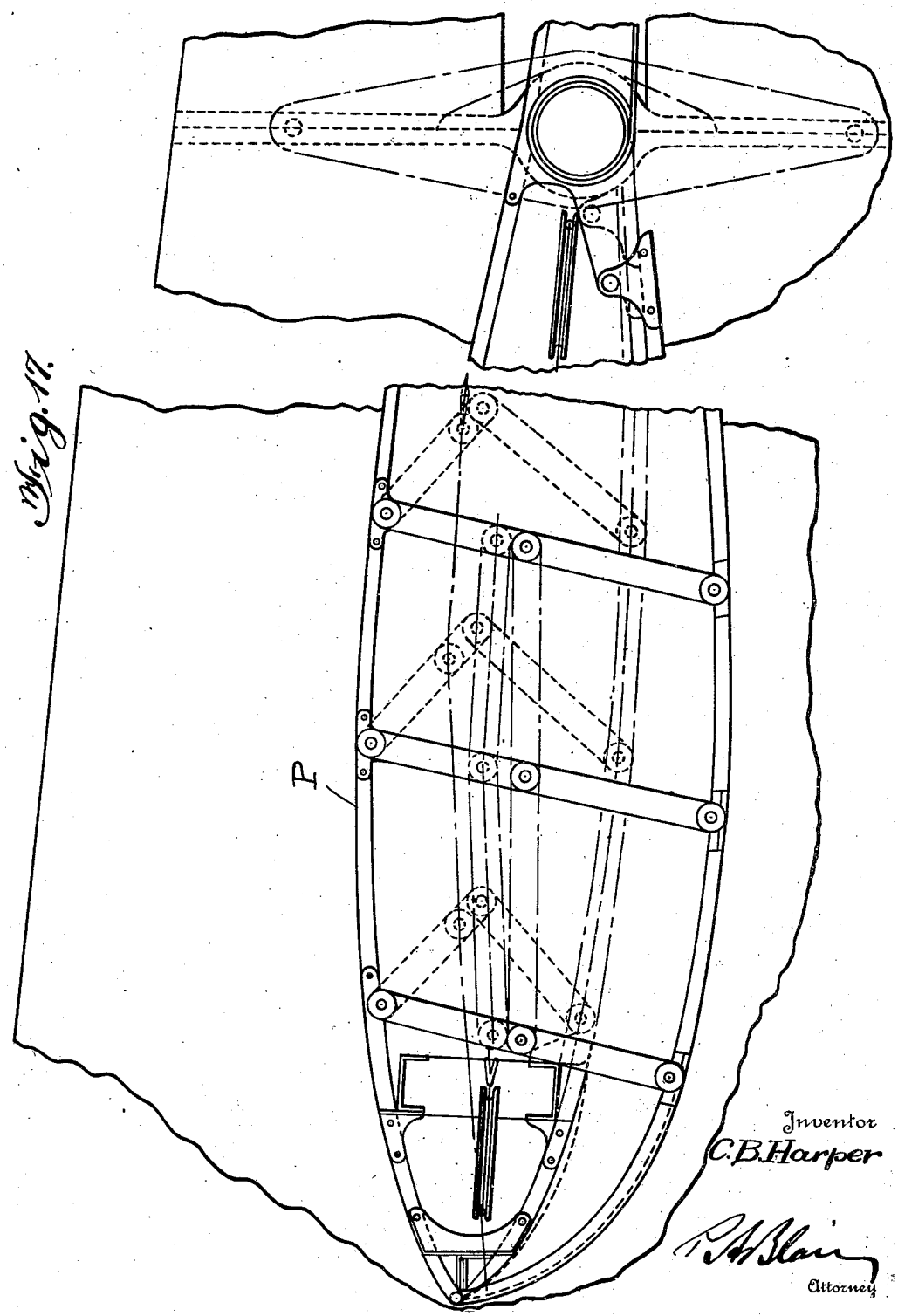

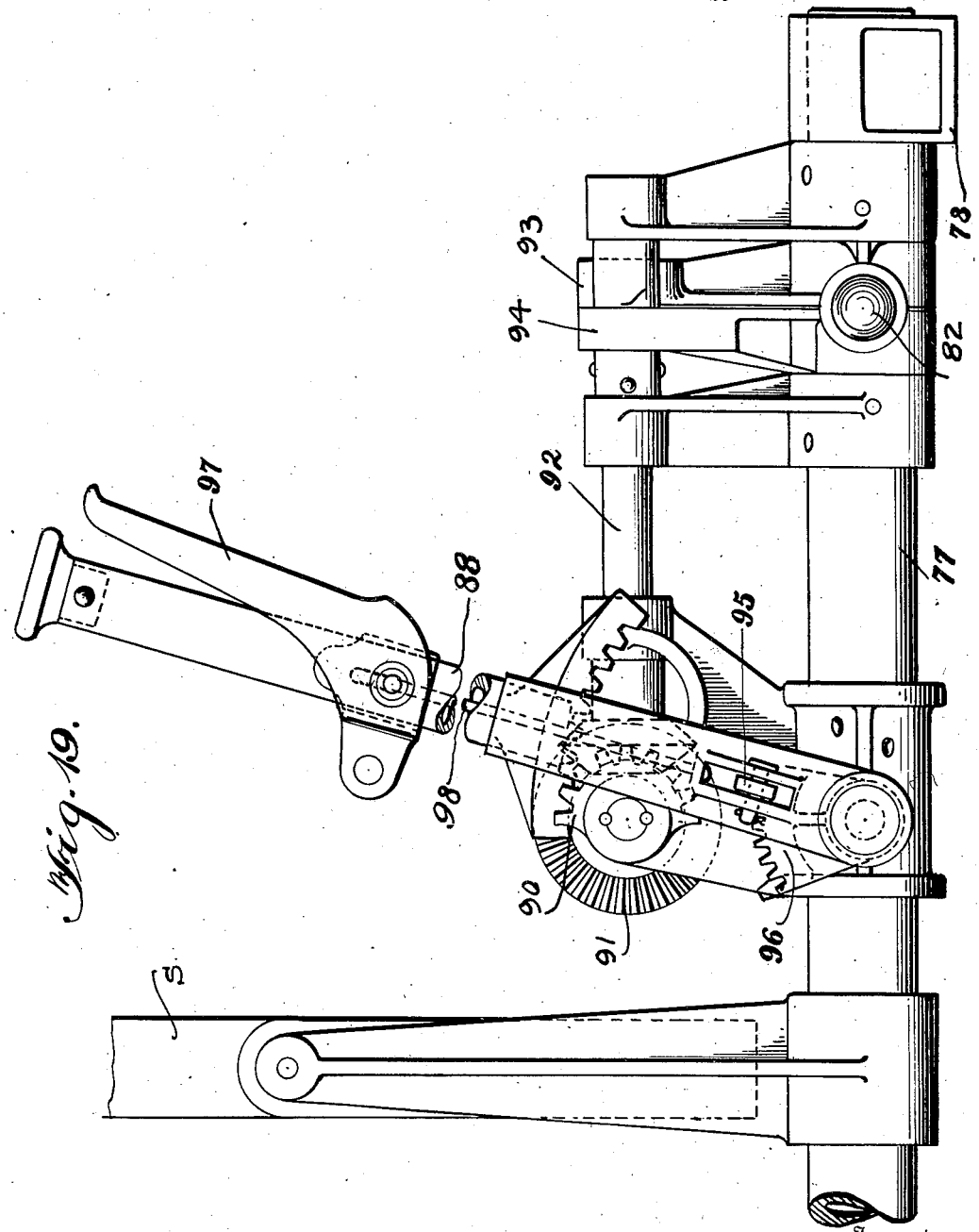

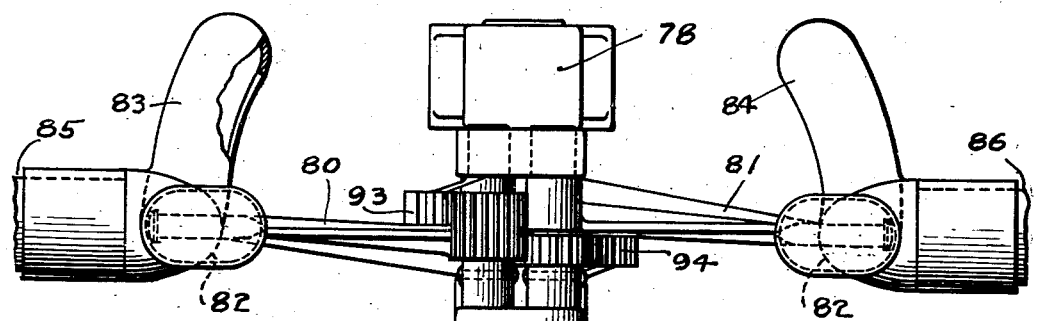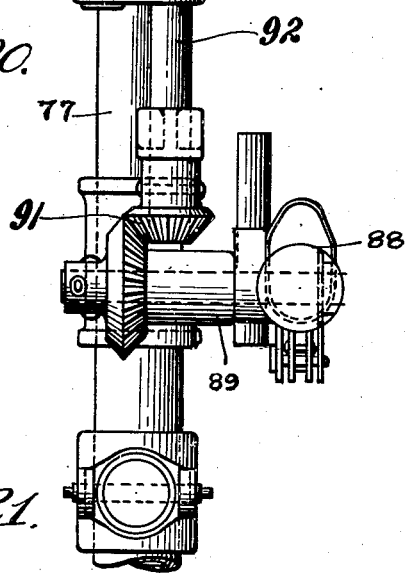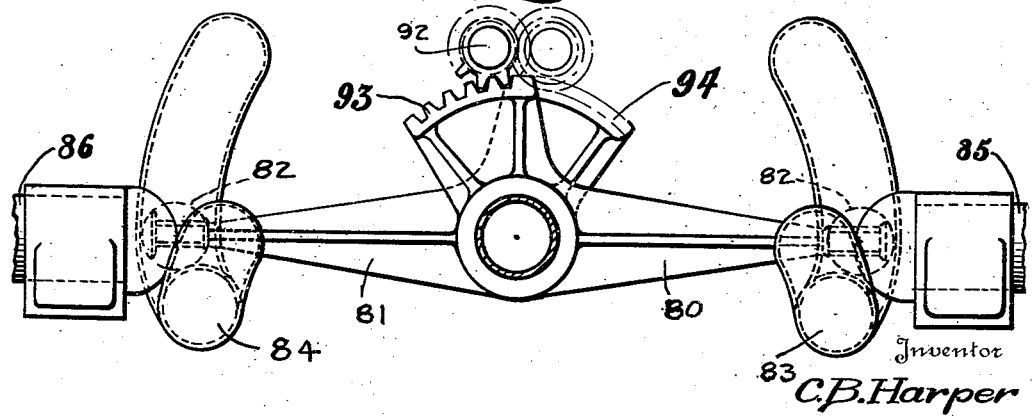

Sept. 27, 1932.   C. B. HARPER   1,880,019
AIRPLANE
Filed April 3, 1922    19 Sheets-Sheet 18

Inventor
C. B. Harper
P. H. Blair
Attorney

Sept. 27, 1932.   C. B. HARPER   1,880,019
AIRPLANE
Filed April 3, 1922   19 Sheets-Sheet 19
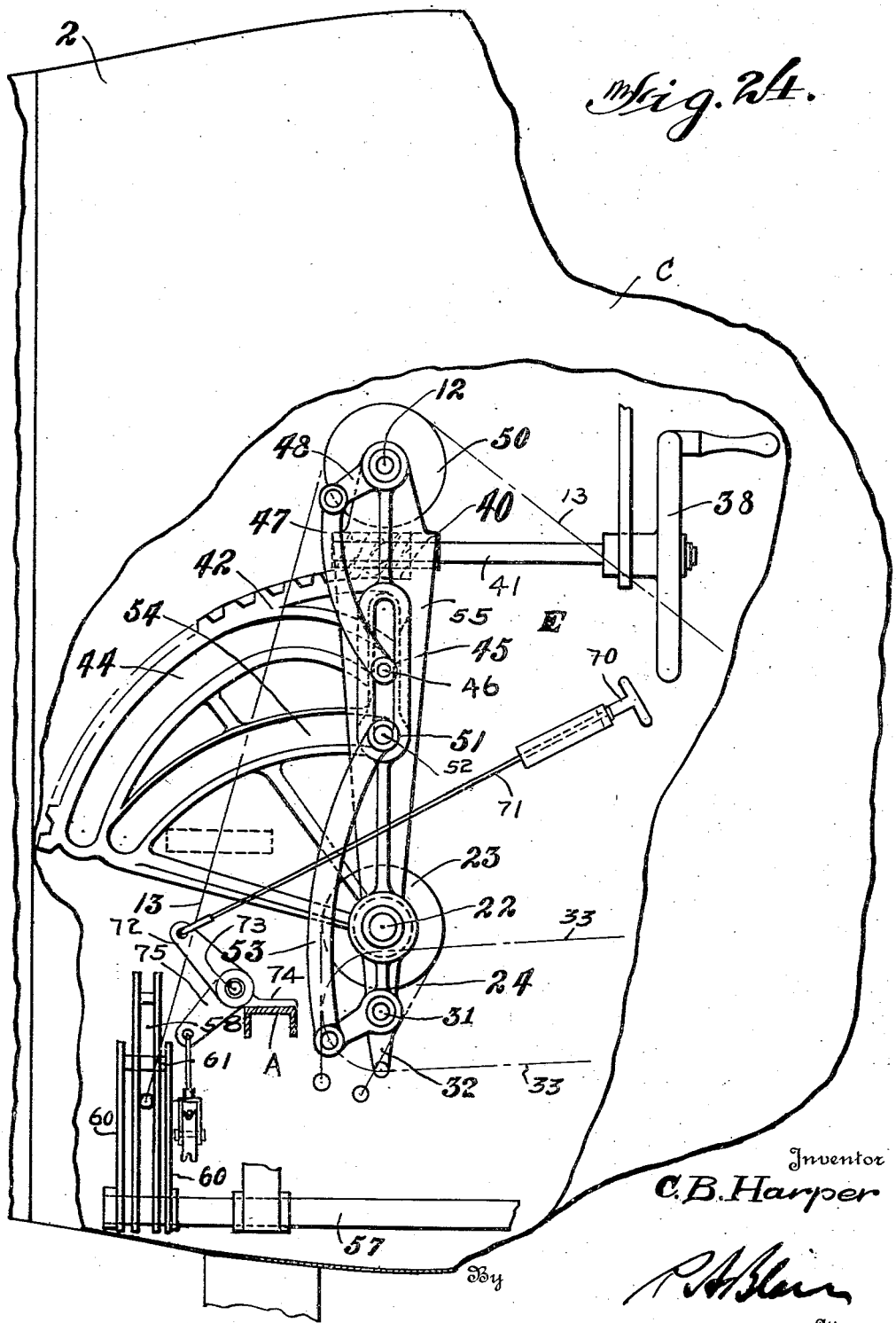

Patented Sept. 27, 1932

1,880,019

UNITED STATES PATENT OFFICE

CARL BROWN HARPER, OF WASHINGTON, DISTRICT OF COLUMBIA

AIRPLANE

Application filed April 3, 1922. Serial No. 549,225.

This invention relates to improvements in airplanes and more particularly to the flight control mechanism.

One of the objects of the present invention is to provide an improved airplane construction which will change the aerodynamic characteristics of the aerofoil for the purpose of increasing the speed range, climb and ceiling.

A further object is to provide an improved aerofoil with trailing edge flap for the purpose of increasing the speed range of the airplane.

A further object is to provide an aerofoil that will enable the plane to land or take-off with greater facility.

A further object is to provide an aerofoil with increased lifting capacity.

A further object is to provide an improved simple and practical mechanism for easily and quickly changing the camber of the wings.

A further object is to provide a mechanism of the last above mentioned character which will give the proper cooperation between change of camber of the wing sections and change of inclination or camber of the stabilizer.

Another object is to provide lateral control by decreasing the lift and increasing the drag on the side of the airplane it is desired to be lowered.

Other objects will be in part obvious and in part hereinafter pointed out in connection with the accompanying drawings which illustrate in detail one of the various possible modifications of the structure as well as various modifications in diagrammatic form showing various types of spoilers applicable to wing sections designed to have a change of camber.

In these drawings similar reference characters denote corresponding parts throughout the several views so far as possible and wherein Figure 1 is a diagrammatic side elevational view of a plane having the near wing omitted and certain parts broken away to show the location of the interior control mechanism more clearly.

Figure 2 is a transverse sectional view taken substantially on the line 2—2 of Figure 1.

Figure 3 is a plan view of a part of one of the wings.

Figures 4 and 4a together constitute an enlarged detail section through the wing at a point termed as a main rib section.

Figures 5, 6 and 7 are detail views of certain parts shown in Figure 4.

Figures 8 and 8a together illustrate an enlarged detail sectional view of a typical section through the wing intermediate the main wing sections.

Figure 9 is a fragmentary plan view of certain parts shown in Figure 8.

Figure 10 is a typical cross section through a main rib.

Figures 11 to 16a, inclusive, show slightly modified forms of spoilers or flaps used for lateral control.

Figure 17 shows a rigid type of stabilizer provided with a swelling lower surface.

Figure 18 shows a rigid type of stabilizer with the swelling feature omitted but having spoilers.

Figures 19 to 22, inclusive, show details of a type of control especially designed for operating spoilers or flaps as shown in Figure 16.

Figure 23:
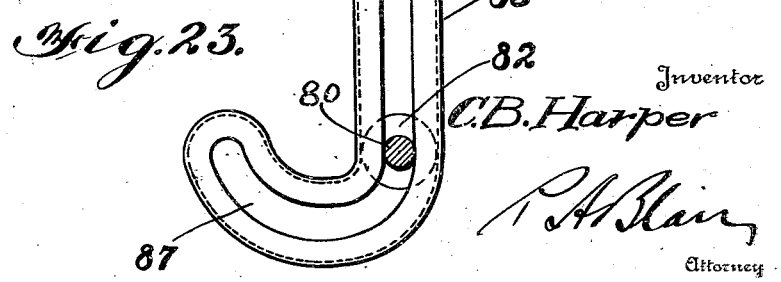

Figure 23 is a detail view showing a development of a cam bell crank lever illustrated in Figures 20 and 21.

Figure 1:
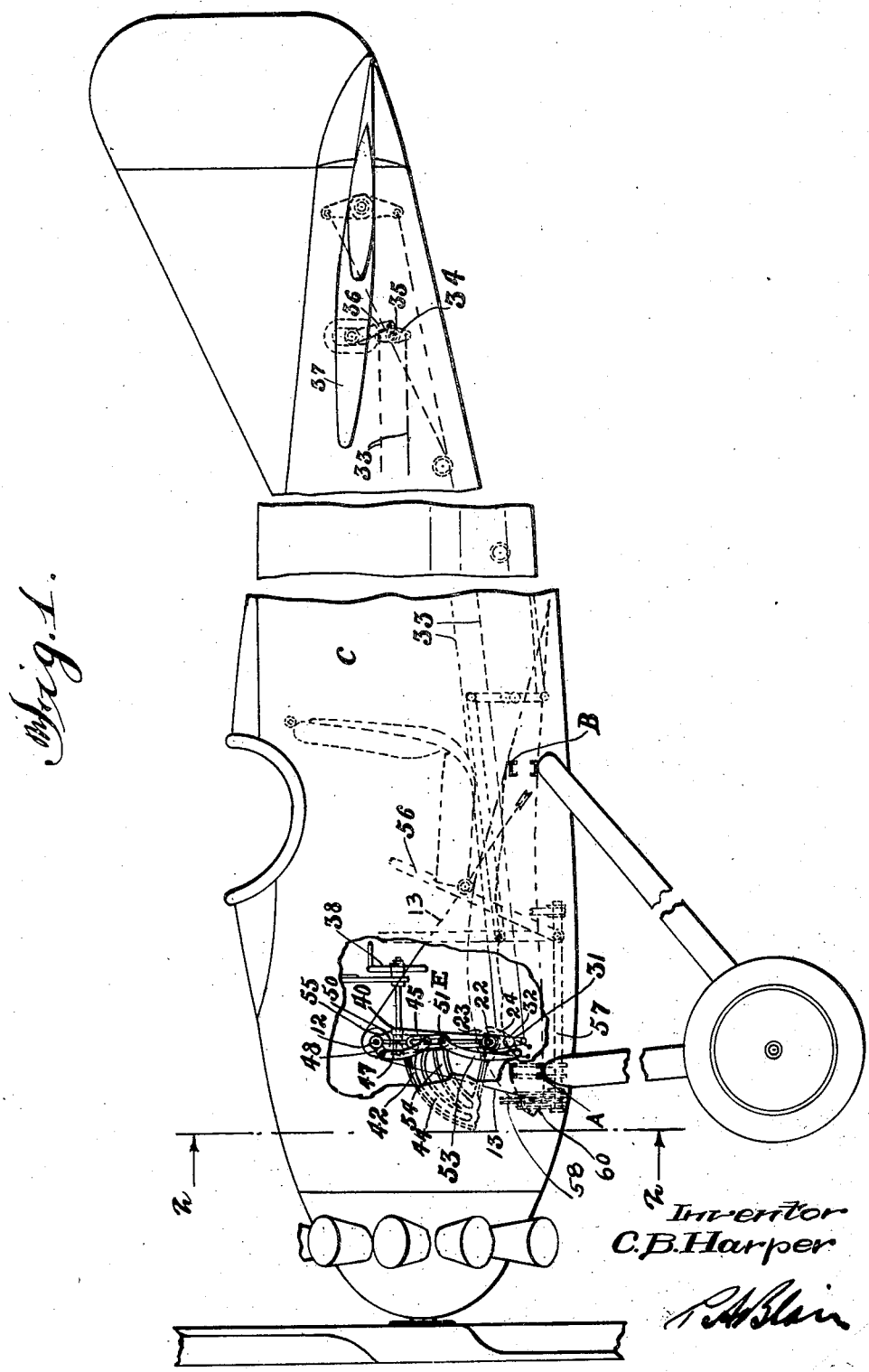

Figure 24 is an enlarged detail view of certain control parts shown in Figure 1.

The general arrangement and construction of my invention consists in the use of a flap or spoiler located on the upper surface of the wing and near the nose thereof operable from the cockpit in conjunction with means for varying the normal lift of the wing or wings such as swelling the wing or otherwise varying the normal airflow over the surface thereof. This construction may be used complementary to or in place of the usual control now employed on aircraft. Trailing edge flaps, which further control the lift of the wing may be operated in conjunction with the operation of the spoilers, which flaps may be operated either simultaneously or separately. Likewise they may be operated simultaneously with the means for varying the normal lift of the wing or wings.

The forward flap or spoiler preferably hinged at or near the nose of the upper surface of the wing is adapted to be swung into operative position thereby to increase resistance and breaks up the air currents acting upon the upper surface of and is adapted to thereby spoil or destroy all or any desired part of the thus increased or variable excess lift of the wing with which it is associated. They may be operated separately for lateral balance, or operated simultaneously for aiding in landing, for example. Likewise, the stabilizer at the tail of the machine is adapted to be actuated simultaneously or in proper sequence with the operation of one or more of the aforesaid different means and functions for the purpose of keeping the machine in properly balanced relation.

All of these operations are under the control of the pilot in the cockpit and may be easily and quickly performed as desired by the mechanism hereinafter more fully explained.

Referring now to the description and operation of the device reference is had to the accompanying sheets of drawings illustrating the mechanism as applied to a modern metal monoplane. In the type of machine illustrated, each section of the wing is supported by a forward spar or beam A and a rear spar or beam B extending outwardly from both sides of the body C and spliced together at the body by means of the usual splice plates or the like.

These spars shown in Figures 4 and 4a are rigidly connected throughout the construction of the wings by main ribs at certain points along the wing. The lower member of the ribs to which the lower surface of the wing is connected preferably consists of a channel member 1 rigidly connected by diagonal braces to the top two members in the form of special angles 2, see Figure 10, located in different planes or staggered so as to permit the telescoping therebetween of the associated upper frame members and link mechanism D which supports the swelling upper surface thereby enabling the latter to have a free up and down movement between said rigid frame members 2. It is to be understood that this type of construction permits the upper and lower members 1 and 2 to be trussed or braced in the usual manner between the beams without substantially increasing the minimum wing thickness and free from interference of the swelling mechanism. The link mechanisms D preferably consist of an upper U-shaped member 3 and a lower flat member 4 pivoted at the lower end with a pin 5 in bearing plates and joined together to form a folding link pivoted at the center as by means of rivets 6.

The upper link 3 is connected by means of a rivet 7 to a hinge member 8 similar to the one shown in Figures 5 and 6 which is secured by rivets or the like to stiffener members 10 for forming a portion of the structure of the swelling upper surface 11.

Inside of the cockpit is mechanism E shown more clearly in Figure 24 for controlling the several operations in the manipulation of the machine. A shaft 12 of said mechanism operates an endless cable 13 by means of pulleys 50 on opposite ends of shaft 12, thence over pulley sheaves 65, 65a located at the front and back of each side of the fuselage and thence over pulley sheaves 13a, 13b, respectively located adjacent and connected to spars A and B at opposite ends of each set of linkages D, Figs. 10, 4 and 4a. Cable 13 is connected at its opposite ends to the opposite ends of the linkages D (whose members are interconnected by preferably rigid connecting rods Da, Figs. 4, 4a) located along the ribs 2, 10 at the extreme end of the wing. Cable 13 is connected to the opposite ends of each set of linkages D located at each of the interior ribs 2, 10, Fig. 3, by cable leads 13d, Figs. 3, 4, 4a, each connected at 13e to cable 13, each of which leads also runs over its adjacent pulley sheaves 13a, 13b at opposite ends and is connected to opposite ends of its respective linkage D, likewise interconnected by rods Da.

Along the leading edge of the wing is shown an angle member F, Figure 4, adapted to be held in place by means of brace channels 16 extending from the front beam A. This angle F forms a portion of the main wing structure and also provides a support for certain pulley sheaves and also a support for the nose hinge of the spoilers. The stiffener members 10 of the first swelling section of the upper surface 11 are hinged at the nose to the angle iron F and connected together and with the link mechanism thereby to form an articulated upper surface. The forward travel of the upper surface is controlled by means of tension exerted on the cable 13 through the mechanism E and by a series of brackets 17 secured to the rear beam as shown clearly in Figs. 4 and 4a. These brackets are provided with slots 18 forming guides for pins or bolts 20 carried by fittings 21 secured to the rear end of the ribs 10 of the last swelling section of the upper surface.

The movement which has been taking place during the swelling of the wing through the operation of the link mechanism D may be accompanied by the operation of the trailing edge flap G shown in Figure 4a. This flap G is turned down by means of the mechanism E a maximum amount to obtain the most advantageous landing or take-off aerofoil section.

Shaft 22, revolubly mounted in suitable bearings in the framework, has fixed to opposite ends drums 23 having cables 24 respectively secured thereto and extending thereabout. From each drum 23 its associated cable 24 runs over a suitable idler pulley 24a at the fuselage near the forward part of the wing, and thence enters its respective wing where it runs in opposite directions over double pulley sheaves 26, Figs. 3, 8. Adjacent each of the sheaves 26a cable lead 25, 25a is secured to the respective cable portions 24 running in opposite directions, which cable leads also run over their respective pulleys 26, thence to and crossed over idler pulley sheaves 27, Fig. 8a respectively mounted in brackets secured to rear spar B. Thence said leads 25, 25a run over the grooved peripheries of their respective sectors 28 revolubly mounted in bearings 30 carried by brackets secured to the rear spar B. Thence said leads 25, 25a are secured preferably to a pin rigidly carried by the rear or trailing edge flap G. The force exerted by the mechanism E on the cable 24 causes the sectors 28 to rotate on bearings 30 secured to the rear beam B and thus move the flap G from the position shown to the adjusted positions indicated in dotted lines in Figures 4a and 8a. A continued operation of the mechanism E causes the flap to travel to the lower dotted position as shown at 45° and at the same time hold the link mechanism D in extended position with the upper surface swollen. On return of the parts to normal position the flap travels back to the 15° position. The remainder of the travel from 15° to 0° causes the lowering of the upper surface to the full line position shown in Figs. 4 and 4a and it is during this movement of the swollen flap that the trailing edge moves from the 15° position to the 0° position. This accomplishes a change from a high speed aerofoil to a climbing aerofoil and to a landing or low speed aerofoil. In order to maintain the longitudinal balance of the machine the angle of incidence of the horizontal stabilizer at the tail must also be altered to correct for the motion of the center of pressure on the main aerofoil when its camber is undergoing a change.

By means of the mechanism E a movement is also provided whereby during the swelling of the upper surface and the lowering of the trailing edge, the angle of incidence of the horizontal stabilizer or tail plane is changing through movement of a link 31 having a sector or arm 32 connected by a cable 33 to similar arms or sectors 34 on a shaft 35 which operates link 36 connected to a stabilizer 37 for causing a drop thereof. Instead of changing the angle of incidence of the horizontal stabilizer cables 33 one may operate a swelling mechanism similar to that of the main aerofoil thereby changing the camber of either the upper or lower surface thereby maintaining the longitudinal balance of the plane during the change of camber of the main aerofoil.

The three operations, namely, the swelling of the wing, the lowering of the trailing edge flap and the changing of the angle of incidence of the stabilizer or tail plane are preferably controlled by the mechanism E located in the cockpit. When the operator desires to manipulate the mechanism E all that is required is that a hand wheel 38 be rotated to cause a worm 40 on a shaft 41 to move a sector 42. This sector 42 is keyed on the main shaft 22 and trunnioned in fixed bearings 43 in the sides of the body C. The shaft 22 has secured thereto arms 23, to which cables 25 are fastened and travel over guide sheaves 26 and 27 to sectors 28 which in turn have their bearing in fixed brackets 30, secured to the rear beam for operating the trailing flap. Thus by turning the hand wheel 38 about four times causes the sector 42 to travel about one-third of its movement and at this point causes the complete operation of the swelling of the wing by means of a cam slot 44 eccentric to the shaft 22 at this point and concentric to said shaft for the remainder of the movement. The cam slot 44 forms a guide for a roller 45 having trunnions 46 which connect through links 47 to arms 48 on the shaft 12 carrying the drums or sectors 50 for operating the swelling of the upper surface through the link mechanism D. The cam slot 54 in sector 42 eccentric to the shaft 22 for the entire movement of the sector 42 or twelve times over for the wheel 38 forms a guide for a roller 51 having trunnions 52 which connect through links 53 to arms or sectors on the shaft 31 to operate the stabilizer at the tail of the machine. The guide cam slot 54 causes a constant change proportional to the main wing adjustment. The rollers 45 and 51 which are forced up and down through contact of the cam slots 44 and 54 of sector 42, are prevented from moving in a fore and aft direction since their trunnions of shafts on which they are mounted are guided in slots located in brackets 55. The brackets 55 in addition to forming bearings for the various shafts, acts as a link to prevent the teeth on worm 40 coming out of mesh with the teeth on sector 42.

The above description completes the operation of the main control mechanism E in changing the high lift aerofoil for landing or taking off to a high speed aerofoil during flight.

In addition to the operation above mentioned the wings have a spoiler hinged preferably along the nose or front edge which is operated by means of the usual control stick 56 and adapted to replace the present practice of the use of ailerons for lateral control. This control stick is pivoted to a shaft 57 having a sector 58 loosely mounted at its forward end. Secured to the shaft 57 fore and aft of the sector 58 are pivoted arms 60. A pin 61 passes through a slot 62 in the sector 58 to form a selective means for operating one or the other of the spoilers. The stick 56 is moved towards the spoiler to be operated manually a cable 63, connected thereto and passing over pulley sheaves 64, and connected by fairleads 65, to a link 66 as shown in Figures 8 and 8a operates the spoilers up against the pressure of the wind. The links 66 are guided in their fore and aft travel by means of slots 67 located at intervals at the rear of beam A. The return of the spoilers to normal or inoperative position is accomplished by tension of an elastic cord or spring 68 on the return cable as indicated at the left of Figure 3. This elastic cord also acts as take-up and compensates for the variance caused by movement of the swelling upper surface.

When it is desired to operate both spoilers at the same time to form a wind brake, a grip 70 is pulled upwardly. (See Figures 2 and 24.) This grip has secured thereto a flexible cable 71 connected to an arm 72 mounted on a shaft 73, the shaft being mounted in suitable bearings 74 on the main beam A. This shaft 73 is also provided with arms 75 supporting pulley sheaves 76 which take up on both forward operating cables at the same time, thus causing both spoilers to be operated independently of the control stick.

Figure 15:
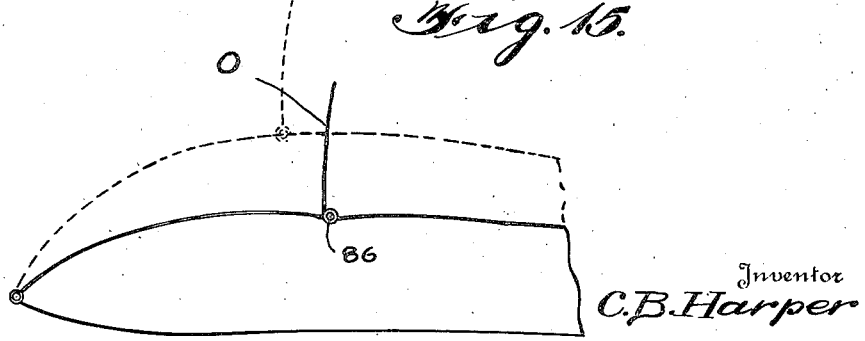
Figure 22:
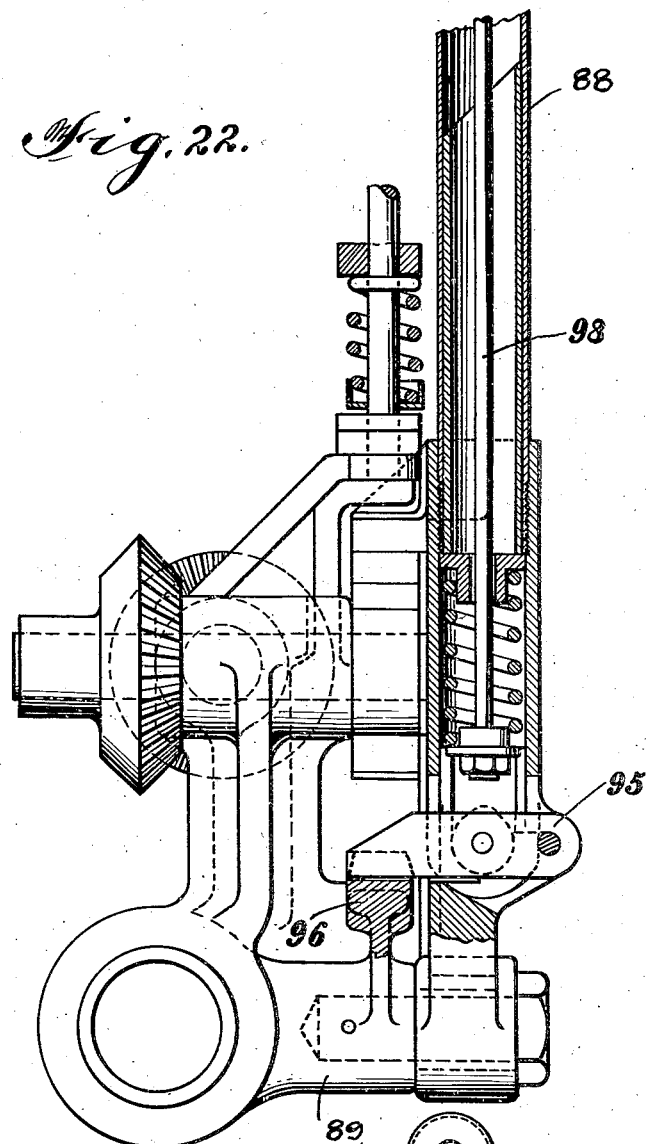

In the modified forms shown in Figures 15 to 16a the spoilers are operated with the usual control stick S in place of the endless cable and spring take-up as shown in Figures 1, 2 and 3, a positively actuated mechanism is provided whereby the spoilers are operated by rotating shafts secured in bearings at certain points along the wing. The control stick is pivoted to move in a fore and aft direction to a shaft 77 for the usual control of the elevator at the tail of the machine. The control stick is also allowed to move in a transverse direction relative to the body and by so doing rocks the shaft 77 in its bearings 78 secured to the main structure of the frame. The shaft 77 also has loosely mounted thereon crank arms 80 and 81 normally held in horizontal position and controlled by the rocking or transverse movement of the control stick. These arms terminate in a ball shaped roller 82 which is free to rotate in a cam shaped bell crank 83 and 84 secured to the transverse operating shafts 85 and 86 of the spoilers O. Rocking of the shaft 77 in one direction allows a ball roller 82, on arm 80 to travel in the inoperative portion of the cam shaped bell crank 83 and prevents the shaft 85 from operating the spoiler O on one wing; while the ball 82 on arm 81 travels in the operative portion of the bell crank 84 causing the shaft 86 to rotate and force the spoiler on the other wing against the pressure of the wind. The portion referred to on the bell cranks 83 and 84 as inoperative, are those which are concentric to the shafts 85 and 86 and the portions referred to as operative, as those which are eccentric to the shafts while the ball 82 on the arm 81 is allowed to run free in a concentric portion of the bell crank 84 thus holding the spoiler O in inoperative position.

When it is desired to operate both spoilers at the same time to spoil the lift on both wings and cause a braking action for retarding the machine, a lever 88, Figure 19, is pulled backwardly. This lever is pivoted on bracket or arm 89 secured to shaft 77 and carries a rack which meshes with a spur gear 90 for operating a chain of gearing 91 and 92 connected to sectors 93 and 94 on arms 80 and 81 respectively for operation of the spoilers O. The braking mechanism or means for operating both spoilers simultaneously is held in inactive position by means of a dog 95 engaging a sector 96 on the bracket 89 and is released for action by operating a grip 97 connected by rod 98 to the dog 95 housed in the lower portion of the lever 88.

In the structure illustrated in Fig. 16 it will be understood by those skilled in the art that when the slot near the forward edge of each plane wing is opened by the usual means, the position of the spoiler O movably mounted near the rear edge of each slot affects and therefore affords means for controlling the flow of air through said slots, and that said spoiler on each wing may be separately operated.

Figure 11 shows a spoiler J applied to the lower surface in addition to the spoiler H on the upper surface and is adapted to be operated in substantially the manner above described.

In Figure 12 there is shown a spoiler J applied to the lower surface of the wing adapted to operate against the force of the wind and a spoiler K on the upper surface pivoted so as to be held open by the load due to the wind. The wind load on one opposes the wind load on the other thereby resulting in a reduction in the force required for their operation.

Figure 13:
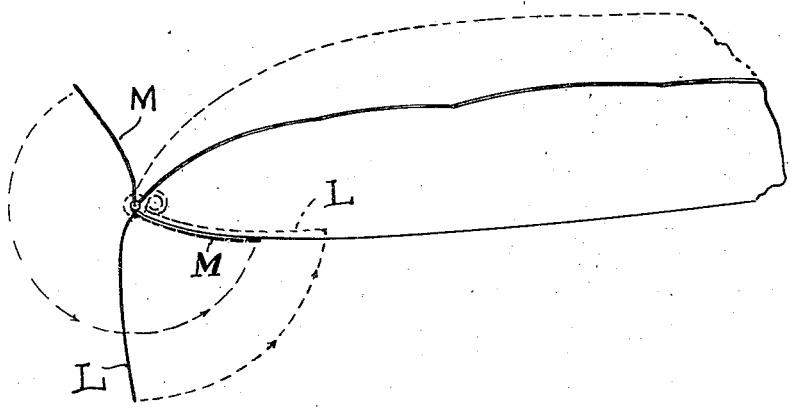

Figure 13 shows two spoilers located on the lower surface of the wing adapted to be operated by rotating shaft and geared so as to allow the travel of the spoiler M to move at an increased speed from that of the spoiler L. This wing houses both members or spoilers in the lower or rigid surface rather than in the upper movable surface.

Figure 14:
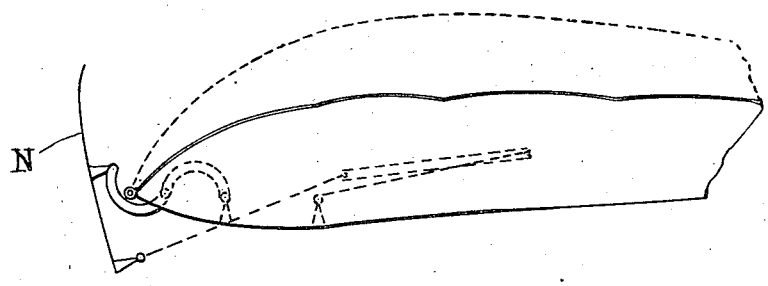

Figure 14 shows a slightly modified type of spoiler also housed in the under surface and adapted to be operated by means of a rotating shaft and suitable link and cable mechanisms.

Figure 15 shows a simplified type of spoiler located on the upper surface of the wing and operated by a rotating shaft while, Figure 16 illustrates an airfoil which consists of main and complementary sections, G5 and G2, the control surface being indicated at G1. The main and complementary sections of the wing are so disposed as to provide together an airfoil section having an opening G4, through the said airfoil section. On the upper surface of the main section, G5, I have shown the spoiler "O" pivoted at 86, which is operated simultaneously or independently with the operation of the control surface, G1, in the same or opposed direction, as is fully set forth in the description of the use of the spoiler used in connection with the swelling wing, illustrated in Figures 1 to 15, 19 to 24 hereof.

Figure 16a shows a spoiler applied to the nose of a typical wood and fabric wing construction.

Figure 17 shows a rigid type of stabilizer P adapted to be operated by cables 31 as shown in Figure 1 in the same manner as that above described for the main wings except in this case the lower surface of the stabilizer is swollen instead of the upper surface.

The same construction may be applied to either upper or lower or both surfaces. This type of mechanism having folding links would be more efficient in larger machines and would also be more practical than attempting to move the whole area as in the form shown in Figure 1.

Figure 18 shows a rigid type of stabilizer with the swelling feature omitted but provided with spoilers similar to those on the main wings and operated by cables 31 from shaft 29, Figure 1, for longitudinal balance of the airplane by the tail of the machine. This type of stabilizer affords a more rigid structure for larger types of machines and would be more practical than attempting to move a whole area as in the form shown in Figure 1. The upper and lower flap or spoiler as shown is operated simultaneously but it is to be understood that the same could be suitably geared to provide alternate operations similar to the means for operating the spoilers shown in Figure 1.

It is believed to be unnecessary to go into a detailed discussion of the operation of the present device for those skilled in the art will fully appreciate the advantages sought to be accomplished and the means by which they are accomplished above described. The actuating mechanism is, of course, susceptible to various modifications and the present disclosure merely indicates a preferred embodiment of the control mechanism for causing the swelling of the upper surface of the wings a simultaneous or independent operation of the spoilers as desired as well as the conjoint operation of the stabilizer as may be necessary. These various functions are obtained by the manipulation of certain control ports within the cockpit in a simple, practical, reliable and efficient manner.

It will be understood by those skilled in the art that the structures shown in Figs. 4 and 16 constitute different species of means for varying the lift of the wing structure by varying the velocity of the air flow substantially uniformly across substantially the whole surface of the wings; that in this invention primarily the trailing edge flaps on each wing do not function in opposite direction as ailerons, but simultaneously in the same direction as additional means for varying the lift of the wing; that the primary function of the spoilers is to control lateral stability by decreasing the lift and increasing the drag on one side of the plane only when they function, for instance, one at a time and to lessen the lift and increase resistance on both sides of the plane, for instance, as in landing, when they function together; and that for greater flexibility and precision of control, as well as in emergency, said trailing flaps may function in opposite directions in conjunction with or independently of the functioning of the spoilers.

It is thus seen that the present invention is adapted to accomplish, among others, all the objects and advantages herein set forth.

What I claim is:—

1. In an airplane wing, in combination, a flexible upper surface and a rigid lower surface, means operable from the cockpit for moving said surface up and down at will, a trailing edge flap adapted to be inclined as said upper surface is swollen, means for further lowering said trailing edge flap after said upper surface has been moved and returning said trailing edge flap to a predetermined angular relation with respect to the wing before said upper surface is collapsed.

2. In an airplane wing, in combination, a flexible upper surface and a rigid lower surface, means for swelling and collapsing the upper surface of said wing at will, a stabilizer at the tail of the machine adapted to be operated simultaneously therewith spoilers associated with said wing and means for operating the spoilers at each side of the body of the machine independently or simultaneously at will.

3. In an airplane wing, in combination, a flexible upper surface to said wing and a rigid lower surface, means for moving said upper surface to and from extended swollen position at will, a spoiler pivotally associated with each wing at each side of the body of the machine, said spoiler comprising two parts, one above and one below the horizontal plane of the wings.

4. In an airplane wing, a flexible upper surface for said wing, said wing having longitudinally fore and after beams connected by diagonal bracing, a trailing edge flap hinged to the rear of said wing, a series of toggle joints for changing the camber of said flexible surface adapted to be controlled at the will of the operator, a horizontal tail plane or stabilizer and means connected therewith for actuating the same together with said flexible upper surface whereby the effective longitudinal angular relation with respect to the forward travel of the plane may be altered by charging the camber of a surface of the horizontal stabilizer at the tail of the plane.

5. In an airplane, in combination, a flexible upper surface, a rigid lower surface, and a movable trailing flap; means for swelling said flexible upper surface and holding the same in its extreme raised position and lowering said trailing flap during a portion of its travel simultaneously, said means also permitting said trailing flap to be lowered to a further angular relation with respect to the position of the swollen surface and permit the same to be returned to its intermediate relation with respect to said upper surface, and travel the remainder of the movement to its original position simultaneously with said upper surface.

6. In an airplane wing, in combination, a flexible upper surface made up of a series of rigid non-flexible surfaces hinged together, a rigid lower surface which is a part of the rigid wing structure proper, and a rigid or non flexible trailing flap pivoted in bearings on said rigid lower surface, means for swelling said upper flexible surface and simultaneously lowering said trailing flap means for giving said flap a further lowering movement to a predetermined angular relation with respect to the simultaneous movement of said upper surface and said flap.

7. In an airplane wing, in combination, a flexible upper surface, a rigid lower surface and a movable trailing flap, means for raising said upper surface and lowering said trailing flap simultaneously for a portion of their travel, said means also causing said trailing flap to travel to a further angular relation to said upper surface.

8. In an airplane wing, in combination, a flexible upper surface, a rigid lower surface, a horizontal stabilizer and a movable trailing flap, means for swelling and collapsing the upper surface of said wing, and means associated with said first mentioned means for also changing the effective angular relation between the wing and the horizontal stabilizer.

9. In an airplane wing, in combination, a flexible upper surface, a rigid lower surface, and a movable trailing edge flap; means for swelling said upper surface and lowering said tail flap, and means associated with said first mentioned means for also changing the effective longitudinal angular relation between the wing and the horizontal stabilizer at the tail of the machine.

10. In an airplane wing, in combination, a flexible upper surface, a rigid lower surface and a movable trailing edge flap; means for swelling said upper surface and lowering said trailing flap and changing the effective longitudinal angular relations between the wing and the horizontal stabilizer at the tail of the machine simultaneously for a given travel, said means holding said upper surface in its extreme swollen position and permitting said trailing flap and the horizontal stabilizer a further travel after the said swelling surface has reached its extreme swollen position.

11. In an airplane wing, in combination, a flexible upper surface, a rigid lower surface, a spoiler, a movable trailing flap, a stabilizer at the tail of the machine adapted to be operated simultaneously therewith and means for operating the spoiler located at the nose of each wing and means for operating same independently or simultaneously.

12. In an airplane wing, in combination, a flexible upper surface, a spoiler mounted thereon near the forward part and a movable trailing flap at the rear part and means for simultaneously raising the spoiler and the upper flexible surface of the wing and depressing the trailing flap.

13. An airplane wing structure, comprising front and rear beams, fixed ribs determining the shape of the lower side of the plane from the rear beam forward to the leading edge, adjustable ribs pivoted at their front and rear ends and determining the shape of the upper side, wing trail portions extending from the rear beam, and operating means including cable and link connections for adjusting the upper ribs.

14. An airplane wing structure having adjustable ribs for determining the shape of the upper side, said ribs comprising sections hinged at the leading edge and sections hinged at a rear region, and means for raising and lowering the proximate portions of said sections.

15. An airplane wing structure having adjustable ribs for determining the shape of the upper side, said ribs comprising sections hinged at the leading edge and sections hinged at a rear region, arms within the wing connected to the proximate portions of said sections, and means for operating said arms.

16. An airplane wing structure comprising fixed ribs determining the shape of the lower side from the rear beam forwardly, adjustable rigid sectional ribs substantially extending from the leading edge to the rear beam determining the shape of the upper side, and a hinged flap extending rearward from the rear beam.

17. An airplane wing comprising the combination of movable rigid rib structures in a plurality of parts, one part being hinged at the leading edge and extending rearward, another of said parts being hinged at the rear beam and extending forward, and the other of said parts being hinged at the rear beam and extending rearward, and means for operating said rib structures at will.

18. An airplane wing structure having front and rear beams, adjustable rib parts for determining and varying the shape of the upper side, one part being hinged at the leading edge, the other part being hinged at the rear beam, and their proximate portions being in the region of the front beam, and means for raising and lowering said proximate portions.

19. An airplane wing structure having fixed ribs determining the shape of the lower side, and adjustable ribs lying in vertical planes between the planes of maximum strength afforded by the fixed ribs, and means for raising and lowering said proximate portions.

20. In an airplane wing, a rigid structure, ribs adapted to support the top covering and including forward and rearward sections, means for fulcruming to said structure one remote portion of one of said sections, means for longitudinally movably and pivotally connecting to said structure the remote portion of the other of said sections, and means for raising and lowering the sections.

21. In an airplane wing, a rigid structure, a movable structure including a plurality of ribs adapted to support the top covering, means for pivotally connecting said ribs at their proximate ends, means for pivotally connecting one end of said movable structure to said rigid structure, means for longitudinally movably and pivotally connecting the remaining end of said movable structure to said stationary structure, and means for moving said movable structure relative to said rigid structure.

22. An airplane wing the upper side of which comprises a plurality of movable rigid sections, one behind another, and means for raising and lowering said sections to vary the thickness of the wing.

23. An airplane wing the upper side of which comprises a plurality of rigid hinged sections, one behind another, and means for raising and lowering said sections to vary the thickness of the wing.

24. An airplane wing the upper side of which comprises a rigid section hinged at the leading edge and at least one movable rigid section behind the forward section, and means for raising and lowering said sections to vary the thickness of the wing.

25. An airplane wing the lower side of which is fixed and the upper side of which comprises a plurality of movable rigid sections, one behind another, and means for raising and lowering said sections to vary the thickness of the wing.

26. An airplane wing the lower side of which is fixed and the upper side of which comprises a plurality of rigid hinged sections, one behind another, and means for raising and lowering said sections to vary the thickness of the wing.

27. An airplane wing the lower side of which is fixed and the upepr side of which comprises a rigid section hinged at the leading edge and at least one movable rigid section behind the forward section, and means for raising and lowering said sections to vary the thickness of the wing.

28. An airplane having in combination a wing, propelling means, means independent of said means for increasing the normal lift of the wing by varying the otherwise normal velocity of the air flow across substantially the extent of said wing, and a spoiler independent of said second named means for controlling lateral stability by localizing on the wing a decrease in its said increased lift.

29. An airplane having in combination a fuselage, wings extending on opposite sides thereof, propelling means, means independent of said means for increasing the normal lift of each of said wings by varying the otherwise normal velocity of the air flow across substantially the extent of each of said wings, a spoiler for each of said wings independent of said second named means for controlling lateral stability by localizing on each or either wing a decrease of each or either of their said increased lift, and means for operating said second named means and said spoilers from the fuselage.

30. An airplane having in combination a fuselage, wings extending on opposite sides thereof, means for increasing the normal lift of the wings by varying the otherwise normal velocity of the air flow across substantially the extent of said wings, a trailing edge flap movably mounted on the rear edge of each wing for further increasing said normal lift, and means whereby said flaps may be operated simultaneously in the same direction with said first named means.

31. An airplane having in combination a fuselage, wings extending on opposite sides thereof, means for increasing the normal lift of the wings by varying the otherwise normal velocity of the air flow across substantially the extent of said wings, a spoiler and a trailing edge flap mounted on each of said wings respectively adapted to reduce and to further increase said increased lift, and means whereby said flaps may be simultaneously operated in the same direction and said spoilers alternately or simultaneously operated independently as well as with said first named means.

32. An airplane having in combination a wing, means for increasing the normal lift of the wing by varying the otherwise normal velocity of the air flow across substantially the extent of said wing, a spoiler adapted to localize on the wing a decrease of said increased lift, and means whereby said means and said spoiler may be operated at will simultaneously or independently.

33. An airplane having in combination a fuselage, wings extending on opposite sides thereof, means for varying the lift of each wing by varying the otherwise normal velocity of the air flow across substantially the extent of said wings, a spoiler movably mounted near the upper nose portion of and juxtaposed to each wing, and means whereby said means and said spoilers may be operated at will simultaneously or independently.

34. In an airplane in combination a wing, means for increasing the normal lift of said wing by varying the otherwise normal velocity of the air flow across substantially the extent of said wing, a spoiler adapted to decrease said increased lift, and a trailing edge flap adapted to still further increase said normal lift.

35. In an airplane in combination a wing, means for increasing the normal lift of said wing by varying the otherwise normal velocity of the air flow across substantially the extent of said wing, a spoiler adapted to decrease said increased lift, a trailing edge flap adapted to still further increase said normal lift, and means whereby said spoiler may be operated simultaneously with said flap or independently thereof.

36. An airplane having in combination a wing, a slot through the nose portion of said wing having its opening on the under surface of the wing in advance of its opening on the upper surface, and a spoiler on the upper surface of the wing adjacent the rear edge of said opening on the upper surface.

37. An airplane having in combination a fuselage, wings extending on opposite sides thereof, a slot through the nose portion of each of said wings having its opening on the under surface of the wing in advance of its opening on the upper surface, and a spoiler on the upper surface of each wing adjacent said slots and adapted when in position to receive the impact of air currents through said slots.

38. An airplane having in combination a fuselage, wings extending on opposite sides thereof, a slot through the nose portion of each of said wings having its opening on the under surface of the wing in advance of its opening on the upper surface for increasing the normal lift of the wings, a spoiler on the upper surface of each wing adjacent and adapted to receive the impact of air currents through said slots, and means whereby said spoilers may be operated independently or simultaneously into and out of impact position.

39. An airplane having in combination a fuselage, wings on opposite sides thereof, a slot through the nose portion of each of said wings having its opening on the under side of the wings in advance of its opening on the upper surface, a trailing edge on each of said wings, and means whereby said edges may be simultaneously operated in the same direction.

40. An airplane having in combination a fuselage, wings, a slot through the nose portion of each of said wings having its opening on the under side of the wing in advance of its opening on the upper surface, a spoiler and a trailing edge mounted on each of the wings, and means whereby said edges may be simultaneously operated in the same direction and said spoilers separately or simultaneously operated.

41. In an aircraft, a frame, a covering adapted to be moved to different positions in contact with the air, means for supporting said covering, a plurality of connections distributed between said frame and supporting means, means for pivotally connecting each of said connections to said frame and supporting means, and operating means carried by said frame and connected to said plurality of connections for moving said covering to different positions and distributing upon said frame the forces that may be exerted on said covering.

42. In an aircraft, a frame, a covering adapted to be moved to different positions in contact with the air, a plurality of substantially rigid members for supporting said covering, a plurality of sets of movable connections distributed one set between each of the supporting members and its juxtaposed frame portion, means for pivotally connecting each of said connections to said frame and supporting means, rigid connections pivotally interconnecting the connections forming each set, and operating means carried by said frame and connected to each set of said connections for moving said covering and supporting members to different positions and distributing upon said frame the forces that may be exerted on said covering.

43. The method of controlling the lateral stability and turning of airplanes having wings, including the steps of increasing the normal lift of the wing while in flight at a definite relative speed, and in said flight controlling lateral stability of the airplane at said speed by decreasing by a spoiler on the wing said increased lift while preserving the normal lift of the wing.

44. The method of controlling the lateral stability and turning of airplanes having wings, including the steps of maintaining at least the normal lift of the wings while in flight at a definite speed, while in said flight increasing the normal lift of the wings independently of maintaining their normal lift, and controlling lateral stability of the airplane at said speed by decreasing by a spoiler on each or either wing said increased lift independently of the normal and increased lift steps.

45. The method of controlling the lateral stability and turning of airplanes having wings including the steps of maintaining at least the normal lift of the wings while in flight at a definite speed, increasing the normal lift of each wing by varying the otherwise normal velocity of the air flow across substantially the extent of said wing or wings independently of propelling means, and decreasing by a spoiler on either or each wing its said increased lift independently of said increasing step.

46. In an airplane wing, the combination of a main wing section, a movable control surface at the trailing edge thereof, a complementary wing section positioned in advance of said main wing section to form together an airfoil section having a slot between said sections, a spoiler mounted upon said main wing section and positioned to receive the impact of air flowing through said slot, and means for operating said spoiler and control surface in the same or opposed directions.

47. In an airplane wing, the combination of a main wing section, a complementary wing section positioned in advance of said main wing section to form together an airfoil section having a slot between said sections, and a spoiler mounted upon said main wing section and positioned to receive the impact of air flowing through said slot.

Signed at Washington, District of Columbia.

CARL BROWN HARPER.